United States Patent
Graßl (10) Patent No.: US 12,017,552 B2
(45) Date of Patent: Jun. 25, 2024

(54) CHARGING DEVICE FOR A MOTOR VEHICLE, INCLUDING CHARGING MODULES EACH HAVING A MODULE INPUT INTERFACE, A MODULE OUTPUT INTERFACE, AND A CONTROL DEVICE COUPLED THEREBETWEEN

(71) Applicant: AUDI AG, Ingolstadt (DE)

(72) Inventor: Tobias Graßl, Denkendorf (DE)

(73) Assignee: AUDI AG, Ingolstadt (DE)

(*) Notice: Subject to any disclaimer, the term of this patent is extended or adjusted under 35 U.S.C. 154(b) by 323 days.

(21) Appl. No.: 17/343,625

(22) Filed: Jun. 9, 2021

(65) Prior Publication Data
US 2021/0387536 A1     Dec. 16, 2021

(30) Foreign Application Priority Data
Jun. 10, 2020    (DE) .......................... 102020115487.9

(51) Int. Cl.
*B60L 53/30*     (2019.01)
*B60L 53/10*     (2019.01)
(Continued)

(52) U.S. Cl.
CPC ............... *B60L 53/30* (2019.02); *B60L 53/11* (2019.02); *B60L 53/14* (2019.02); *B60L 53/16* (2019.02);
(Continued)

(58) Field of Classification Search
CPC .......... B60L 53/16; B60L 53/14; B60L 53/22; B60L 53/302; B60L 53/31; B60L 53/66;
(Continued)

(56) References Cited

U.S. PATENT DOCUMENTS 8,890,474 B2 * 11/2014 Kim ....................... B60L 53/65
                                                             320/109
11,342,780 B1 *  5/2022 Brown ...................... H02J 7/35
(Continued)

FOREIGN PATENT DOCUMENTS

CN          209351258 U  *  9/2019
DE     10 2015 200 960 A1     7/2016
(Continued)

*Primary Examiner* — Richard Isla
*Assistant Examiner* — Manuel Hernandez
(74) *Attorney, Agent, or Firm* — Seed IP Law Group LLP (57) ABSTRACT

A charging device for a motor vehicle having a device input interface and a device output interface, wherein the charging device comprises a plurality of charging modules to which an input voltage can be provided by a respective module input interface and the device input interface, wherein a respective voltage rectifier of the respective charging module is configured to convert the input voltage into an output voltage provided at a respective module output interface, wherein the module output interfaces are connected in parallel with the device output interface, wherein a charging module removed from the charging device can be used separately from the charging device as a charger in order to charge the energy storage device of the motor vehicle or a further motor vehicle from the power source or a further power source, wherein the respective charging module comprises a control device which is configured on the one hand, to detect at least one operating parameter of the respective charging module and/or to receive at least one item of communication information from a communication device on the motor vehicle side and, on the other hand, to control or regulate the output voltage at the module output interface and/or a charging current depending on the operating parameter and/or the communication information.

13 Claims, 4 Drawing Sheets

(51) Int. Cl.
*B60L 53/14* (2019.01)
*B60L 53/16* (2019.01)
*B60L 53/302* (2019.01)
*B60L 53/31* (2019.01)
*B60L 53/66* (2019.01)
*B60L 53/80* (2019.01)
*H02J 7/00* (2006.01)
*B60L 53/22* (2019.01)

(52) U.S. Cl.
CPC .............. *B60L 53/302* (2019.02); *B60L 53/31* (2019.02); *B60L 53/66* (2019.02); *B60L 53/80* (2019.02); *H02J 7/0042* (2013.01); *B60L 53/22* (2019.02); *H02J 7/00034* (2020.01)

(58) Field of Classification Search
CPC .......... B60L 53/80; B60L 53/11; B60L 53/30; H02J 7/0042; H02J 7/00034
USPC .................................................. 320/107, 109
See application file for complete search history.

(56) References Cited

U.S. PATENT DOCUMENTS

| | | |
|---|---|---|
| 2008/0067974 A1 | 3/2008 | Zhang et al. |
| 2016/0193933 A1* | 7/2016 | Jiang ..................... B60L 53/305 |
| | | 320/109 |
| 2017/0033408 A1* | 2/2017 | O'Hora ................. H02J 7/0048 |
| 2017/0279170 A1 | 9/2017 | O'Hora |
| 2019/0217734 A1 | 7/2019 | Li et al. |
| 2020/0203969 A1* | 6/2020 | Truettner .......... H02J 7/007192 |
| 2021/0354578 A1* | 11/2021 | Kirschner ............... B60L 53/53 |
| 2022/0340302 A1* | 10/2022 | Grabner .................... B64F 1/34 |

FOREIGN PATENT DOCUMENTS

| | | | |
|---|---|---|---|
| DE | 102015200960 A1 * | 7/2016 | ......... B60L 11/1812 |
| DE | 102015200960 A1 | 7/2016 | |
| DE | 102016123066 A1 | 5/2018 | |
| DE | 102016123924 A1 | 6/2018 | |

* cited by examiner

CHARGING DEVICE FOR A MOTOR VEHICLE, INCLUDING CHARGING MODULES EACH HAVING A MODULE INPUT INTERFACE, A MODULE OUTPUT INTERFACE, AND A CONTROL DEVICE COUPLED THEREBETWEEN

BACKGROUND

Technical Field

Embodiments of the invention relate to a charging device for a motor vehicle with a device input interface for connecting the charging device to a power source and a device output interface for connecting the charging device to a charging port of a motor vehicle in order to provide a charging current for charging an energy storage device of the motor vehicle, wherein the charging device comprises a plurality of charging modules to which an input voltage, in particular an alternating current voltage, can be supplied by means of a respective module input interface and the device input interface, wherein a respective voltage rectifier of the respective charging module is configured to convert the input voltage into an output voltage, in particular a direct current voltage, provided at a respective module output interface, wherein the module output interfaces are connected in parallel with the device output interface, wherein at least one of the charging modules is removable from the charging device. In addition, embodiments of the invention relate to a charging system.

Description of the Related Art

Two different charging options are often provided for electric and hybrid vehicles. On the one hand, the vehicle can be charged with relatively low power, for example in the single-digit kilowatt range, directly from the alternating current network, for example by means of a traditional power outlet. On the other hand, charging with relatively high power is possible at direct current charging stations by means of a direct current connection. These have outputs of more than 22 kW, for example in the range from 50 kW to 150 kW.

In order to also allow fast charging of electric vehicles in the private sector, there are now direct current chargers for private customers in the form of so-called direct current wallboxes, whose output power is typically in the range between 11 kW and 22 kW. However, since it cannot always be assumed that such a direct current charging option will be available, vehicles must still be fitted with alternating current chargers that allow the vehicle to be charged at normal sockets with reduced power.

The procedure described above results in increased costs for the customer, since the costs both for the wallbox, on the one hand, and for the alternating current charger in the vehicle, on the other, need to be covered. In addition, the alternating current charger requires a certain amount of space in the vehicle and increases its weight. In principle, instead of a built-in alternating current charger, a mobile external charger could be used for charging on the road. However, this would require the purchase of separate chargers for charging at home and for charging on the road, which would incur further costs and reduce customer acceptance.

The DE 10 2015 200 960 A1 publication therefore proposes the use of a charging device whose power modules can be removed from the charging device for converting alternating current into direct current. The removed power module can then be used together with a so-called DC to DC cable, which comprises a DC converter for setting the charging voltage for the battery as well as a communication device for communicating with the motor vehicle, for charging the motor vehicle independently of the charger. In other words, the publication proposes to use the power module together with other power modules in a charging device or separately from the charging device together with a DC to DC cable for charging the motor vehicle. This eliminates the need to purchase a separate power module for mobile charging. However, for mobile charging, it is still necessary to provide the components required for charging control and communication as a separate device, namely as part of the DC to DC cable.

Mobile charging is therefore only possible with an additional, relatively complex component, which results in additional costs or which is not necessarily available at the desired charging location.

BRIEF SUMMARY

Embodiments of the invention specify a comparatively improved charging device which, in particular in the case of stationary charging, enables high charging power and, at the same time, mobile charging with little additional cost.

Embodiments of the invention relate to a charging device of the type mentioned at the beginning, wherein the charging module removed from the charging device can be used separately from the charging device as a charger in order to charge the energy storage device of the motor vehicle or of a further motor vehicle from the power source or a further power source, wherein the respective charging module has a control device which is configured, on the one hand, to detect at least one operating parameter of the respective charging module and/or to receive at least one item of communication information from a communication device on the motor vehicle side and, on the other hand, to control or regulate the output voltage at the module output interface and/or a charging current depending on the operating parameter and/or the item of communication information.

A charging device can thus provide all charging-related components in the respective charging module, so that in addition to the charging module, only passive cables are required for charging the motor vehicle independently of the charging device. In addition, apart from the charging modules, the charging device can be relatively simple in design. In the simplest case, it only needs to connect the respective module input interfaces to the device input interface and connect the module output interfaces in parallel to the device output interface. As will be explained later, the charging device can comprise further components, in particular for cooling the charging modules.

The connection of the device input interface to the module input interfaces can be done in such a way that the module input interfaces are connected in parallel. However, it may be particularly advantageous if the charging device is connected to a multi-phase power source, for example, a three-phase power system, wherein one of the charging modules or a plurality of the charging modules connected in parallel is/are used for each of the phases. When the charging module is used independently of the charging device, it is thereby possible that only one phase of charging can be used, which is, for example, sufficient for charging from a traditional power outlet.

The power source can be a power grid, in particular an alternating current grid, which may provide a single-phase or three-phase voltage. The output voltage at the respective module output interface or alternatively the charging current can be adjusted by appropriate control of the voltage rectifier, for example by adjustment of a duty cycle. In an additional or alternative manner, the output voltage or alternatively the charging current can be adjusted by disconnecting the power converter from the module input interface or module output interface, as will be explained later.

The control or alternatively regulation of the output voltage or alternatively the charging current as a function of the operating parameter makes it possible, in particular, for the control device to act as a protection device which, for example, triggers a shutdown of the voltage rectifier or alternatively a disconnection of the voltage rectifier from the module input interface or alternatively the module output interface if, for example, an overvoltage is detected, the temperature exceeds a limit value, an output resistance that is too high or too low is detected, an interruption of a charging cable is detected, for example, on the basis of monitoring of a pilot line, or the like. In an additional or alternative manner, a fault current detection and/or a ground monitoring can be part of the internal protection devices. Operating parameters can be determined by means of sensors or alternatively by means of a voltage measurement, for example, at the module input interface or at the module output interface. If a digital control device is used, it is possible, for example, to use an analog-to-digital rectifier or a compressor to provide processible digital signals.

Communication with the communication device on the motor vehicle side can be carried out in particular by wire by means of the module output interface or alternatively by means of the device output interface. For this purpose, for example, a separate signal line in the power cable can be used. In traditional charging devices, pilot lines are used for this purpose, by means of which signals can be transmitted, for example, by pulse width modulation or alternatively by measuring switched resistances.

In an additional or alternative manner, a so-called powerline communication can be used, in which the communication signals are modulated onto the direct current voltages transmitted by means of the power line.

Both approaches are already used in charging devices for motor vehicles and will therefore not be explained in detail. The communication with the communication device on the motor vehicle side can be used in particular to detect power requirements of the motor vehicle and to control the charging process accordingly, to monitor a correct connection between the charging device or alternatively the charging module and the motor vehicle, and the like.

The respective voltage rectifier may be connected to the module input interface by means of a respective input switching device, wherein the input switching device is arranged to disconnect the voltage rectifier or at least one terminal of the voltage rectifier from the module input interface and/or to connect it to the module input interface in response to a control signal from the control device. In an additional or alternative manner, the respective voltage rectifier may be connected to the module output interface by means of a respective output switching device, wherein the output switching device is arranged to disconnect the voltage rectifier or at least one terminal of the voltage rectifier from the module output interface and/or to connect it to the module output interface in response to a control signal from the control device. Whereas it is usually possible to control the voltage rectifier in such a way that the output current is reduced to zero, for example, by setting the duty cycle to zero, the operational safety can often be further increased if the described input switching device or alternatively output switching device are additionally used. Charged capacitors are, for example, hereby also separated from the interfaces so that, for example, robust protection against contact is achieved when the module is removed and, even in the event of malfunctions of the rectifier, charging currents can be strongly prevented from being provided at the module or device output interface.

The charging device may comprise a housing in which the charging modules are mechanically reported, wherein, in this manner, a respective first housing connection of the housing connects the respective module input interface to the device input interface that is attached to the housing and a respective second housing connection connects the respective module output interface to the device output interface attached to the housing. In this manner, this allows the individual charging module to be inserted into or alternatively be removed from the charging device in a few simple steps, and wherein a rugged mechanical mounting and electrical contact can be achieved.

The housing may include a fan to cool the charging modules. In particular, the charging modules may have a respective heat sink adjacent to an air volume in which the fan is located. In this manner, a housing-side fan provides improved cooling of the charging modules in the charging device, allowing them to provide potentially higher charging powers.

In an additional or alternative manner, a coolant circuit of the housing may be coupled to a respective coolant channel of the charging module by means of coolant connections. In this manner, cooling by means of a coolant is, for example, made possible or, alternatively, it is possible to direct an air flow specifically through the charging module in order to further improve cooling. The coolant connections are, in particular, self-sealing, so that when the charging mode is removed, the coolant circuit inside the charging module remains sealed by closing the respective coolant connection. The coolant already in the charging module can, for example, be pumped out before the charging module is removed. Alternatively, it is also possible for the coolant to remain in the charging module and be kept in a sealed volume by closing the coolant connections. If the coolant channels are however used for air cooling, the coolant channels of the charging module can also remain open in removed state of the charging module.

The respective charging module can have a respective housing sensor, wherein the control device is configured to detect by means of the housing sensor whether the respective charging module is reported in the housing, and, as a function thereof, to adjust the output voltage and/or the charging current and/or a further operating parameter of the charging module. The housing sensor can be formed, for example, by a sensing device or by two contact surfaces which become conductively connected by the housing. In an additional or alternative manner, a temperature sensor of the charging module can be used to monitor the temperature of the respective charging module or at least one component of the charging module, and a derating, i.e., a reduction of the charging power or charging current, can occur if the temperature is too high.

As explained above, an additional active cooling can be provided in the housing by the closed coolant circuit and/or by the fan. It is hereby possible that a higher waste heat production of the charging module and thereby a higher charging power is permissible. If the charging module is used outside the housing, it is thereby possible that the charging current or another parameter can be varied to provide a lower charging capacity overall. In an additional or alternative manner, it would also be possible to control or alternatively regulate the charging power as a function of a detected temperature of the charging module. This would also enable the charging power to be adapted dependent on whether additional cooling is available.

The control device can be configured to receive the communication information by wire via the module output interface or wirelessly and/or to send further communication information by wire via the module output interface or wirelessly. Various possibilities for such communication have already been discussed above.

In addition to the charging device described herein, embodiments of the invention relate to a charging system comprising the charging device described herein as well as a first connection cable for connecting the module input interface of one of the charging modules to the power source or the further power source and a second connection cable for connecting the module output interface of this charging module to a charging port of the motor vehicle or the further motor vehicle. As explained above, the first and second connection cables may be purely passive cables. The first connection cable may comprise, on one side, a connector for connection to the module input interface and, on the other side, a connector for connection to, for example, a common power outlet or a three-phase outlet. The second connector cable may include a connector at one end for connection to the module output interface and a connector at the other end for connection to the charging port of the motor vehicle. The connectors at the ends of the first and second connection cables, respectively, may be connected by a multi-core cable.

BRIEF DESCRIPTION OF THE SEVERAL VIEWS OF THE DRAWINGS

Further advantages and details will be apparent from the following detailed description and the accompanying drawings.

DETAILED DESCRIPTION

Figure 1:
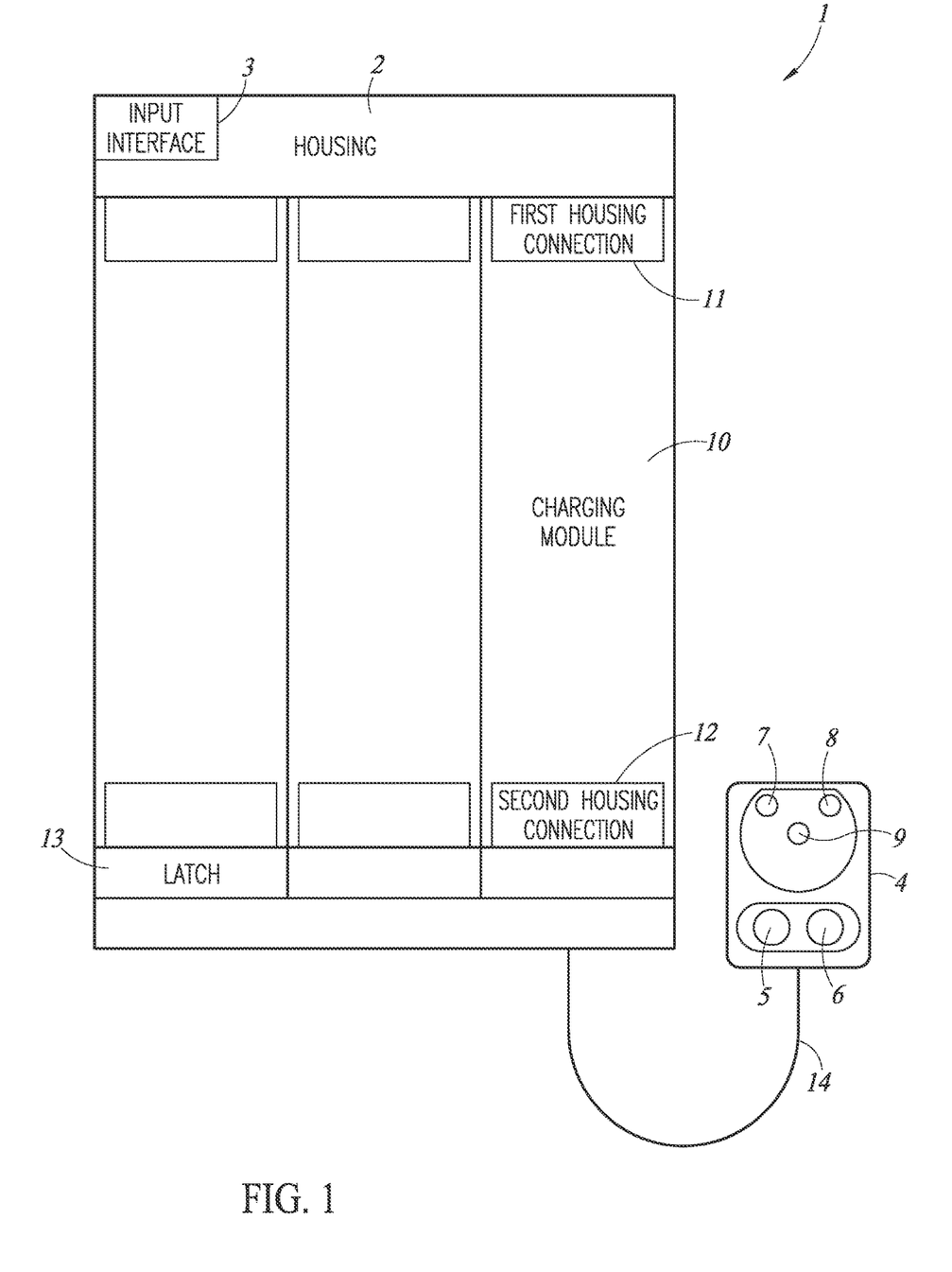
FIG. 1 shows an example of a charging device.

FIG. 1 shows a charging device 1 for a motor vehicle. This is formed by a housing 2 and a plurality of charging modules 10 mechanically reported in the housing 2 and contacted by the housing 2. A device input interface 3 is provided on the housing 2 for connecting the charging device 1 to a power source, in particular to a three-phase power supply. The device input interface 3 is shown only schematically and, for example, in the case of a charging device 1 designed as a wallbox, can be formed by connection terminals for power lines of the three-phase connection. Alternatively, for example, a power cable with a corresponding plug could also be used as the device input interface 3.

The charging of the motor vehicle, which is not shown, takes place by means of a device output interface 4, which, in the example, is a charging plug for traditional charging sockets of motor vehicles. This plug is connected to the housing 2 by means of a cable 14 and has a protective contact 9, two terminals 5, 6 for direct current charging, in addition to signal lines 7, 8, which are also referred to as pilot lines and which serve, on the one hand, to detect a proper connection and, on the other hand, to enable communication between the motor vehicle and the charging device.

Figure 2:
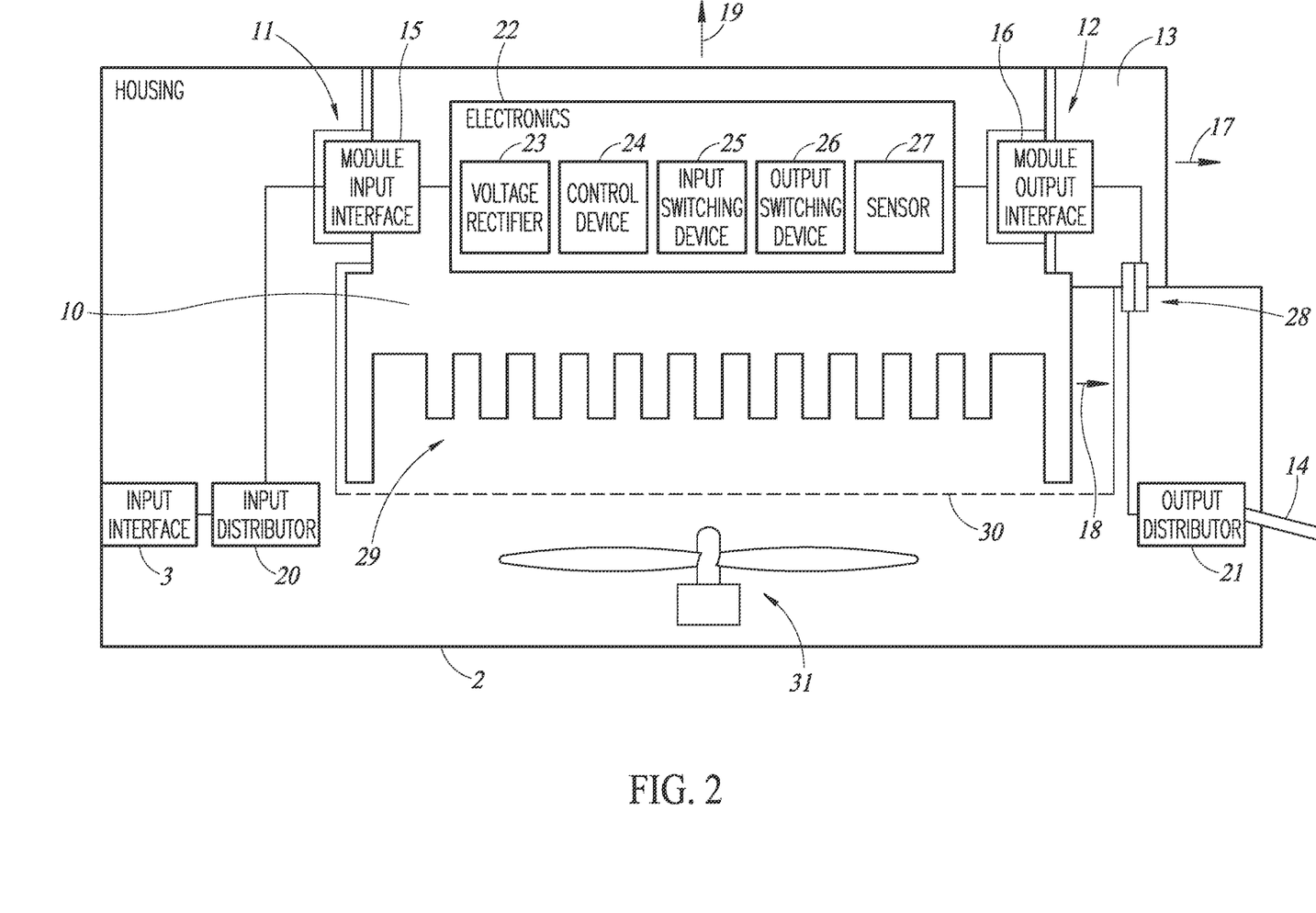
FIG. 2 shows a cross-sectional view of the charging device shown in FIG. 1.

Further details of the charging device are elucidated with additional reference to FIG. 2, which schematically shows a cross-section through the charging device 1. The individual charging modules 10 are reported in positively-locking manner by a respective latch 13. In order to remove a charging module 10, the latch 13 can be moved in the direction of the arrow 17, after which the module 10 can be displaced in the direction of the arrow 18 and then removed, as shown by the arrow 19. The described method of mechanically retaining the individual module 10 to the housing 2 is one embodiment. A variety of other embodiments are also possible.

In the installed state of the charging module 10, the electronics 22 of the respective charging module 10 are connected to the device input interface 3 by means of a module input interface 15, a first housing connector 11 and an input distributor 20. The input distributor 20 can, for example, feed one phase of a supplied three-phase alternating current to each of the individual charging modules 10, or it can also connect the individual charging modules 10 in parallel to one phase.

The electronics 22 are connected to the device output interface 4 or alternatively the cable 14 by means of a module output interface 16, a second housing connection 12, and an output distributor 21, which, for example, connects the module output interfaces 16 in parallel to connect them to the device output interface 4. FIG. 2 also shows a contact 28 that automatically disconnects this connection when the latch 13 is opened.

In addition to a voltage rectifier 23, which converts the input voltage at the respective module input interface 15 into an output voltage at the respective module output interface 16, each of the charging modules 10 comprises a control device 24. This control device can detect operating parameters of the respective charging module, for which purpose, for example, at least one sensor 27 and/or at least one device for voltage or current measurement can be used to monitor the temperature of the charging module 10 or alternatively of its electronics 22, input voltages and/or currents, output voltages and/or currents, frequencies of an alternating input current and the like, and to control or alternatively regulate the output voltage or alternatively the charging current as a function of these operating parameters.

Such a control or alternatively regulation may, for example, reduce the charging current to reduce a charging power when excessive temperatures are detected. In particular, it is possible for the output voltage or charging current to be controlled to zero, especially by disconnecting the voltage rectifier 23 from the module input interface 15 and/or the module output interface 16. To make this possible, the voltage rectifier 23 is connected to the module input interface 15 by means of an input switching device 25 and to the module output interface 16 by means of an output switching device 26, wherein the input switching device 25 and/or the output switching device 26 can disconnect and also connect this respective connection in response to a control signal from the control device 23. This makes it possible, for example, to disconnect the voltage rectifier 23 from the inputs and outputs of the charging module 10 when a fault condition is detected.

The control device 23 is also arranged to communicate by wire with a communication device of the motor vehicle, which is not shown, by means of the module output interface 16 or the device output interface 4. Through this, for example, a power line communication or pulse width modulation or alternatively switching of resistors can be used to communicate which voltages are to be provided for charging. The control device 24 can accordingly control the voltage rectifier 23.

Figure 3:
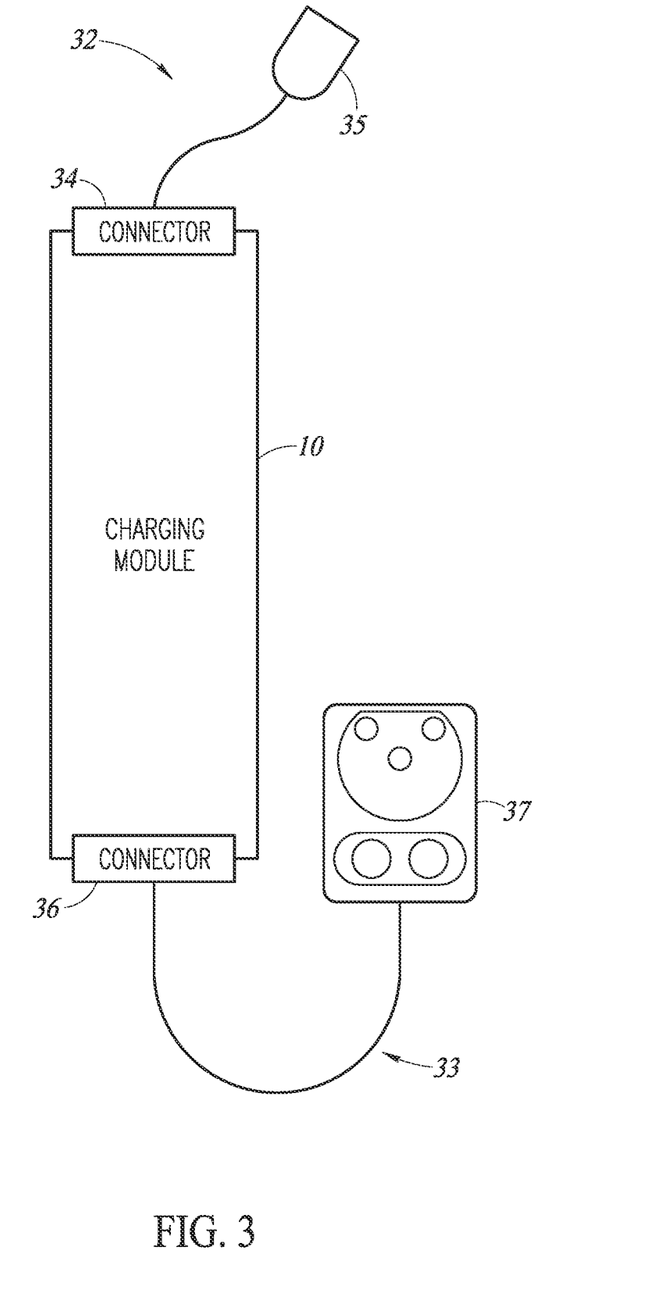
FIG. 3 shows a connection of a separately used charging module with connecting cables for connecting the charging module in a power source and a charging port of a motor vehicle.

Each of the charging modules 10 thus has all the essential components for charging the energy storage unit of the motor vehicle, so that each individual charging module 10 can also be used independently of the charging device 1 for charging a motor vehicle by connecting corresponding connection cables 32, 33, as shown in FIG. 3. In this regard, a first connection cable 32 comprises a connector 34 for connection to the module input interface 15 and a connector 35 for connection to a power source, for example a traditional socket. A second connection cable 33 has a connector 36 for connection to the module output interface 16 and a connector 37 for connection to a charging port of a motor vehicle.

When using a charging system comprising the connection cables 32, 33 in addition to the components shown in FIG. 1, a charging of a motor vehicle can thus be performed both by the charging device 1 when all or at least parts of the charging modules 10 are installed in the housing 2, as well as a charging of the motor vehicle independently of the charging device 1 when at least one of the modules 10 is removed and connected to a power source and to the motor vehicle by means of the connection cables 32, 33.

In addition to providing electrical contact mechanical retention for the individual charging modules 10, the housing 2 of the charging device 1 can have additional functions and, in particular, enable improved cooling of the charging modules 10. For this purpose, in the example shown in FIG. 2, a fan 31 is arranged in the housing 2 to cool the charging modules 10. The individual charging modules 10 each have heat sinks 29 which are adjacent to an air volume 30 in which the fan is arranged. Here, for example, a grid may be arranged between the fan 31 and the heat sink 29 to prevent contact with the fan 31 when the charging module 10 is removed.

By using this or other approaches to cooling the charging modules 10 while they are installed in the housing 2, it may be possible for the charging modules 10 to provide higher power when inside the charging device 1 than in the case shown in FIG. 3 where they are used outside the housing 2. It is therefore possible that the sensor 27 or one of the sensors 27 is a housing sensor 27, for example, a pressure sensing device or the like, by means of which it is detected when the charging module 10 is installed in the housing 2. If this is not the case, a charging power can, for example, be reduced. In an additional or alternative manner, temperature monitoring can be performed by a temperature sensor and the charging power can be reduced depending on the temperature.

Figure 4:
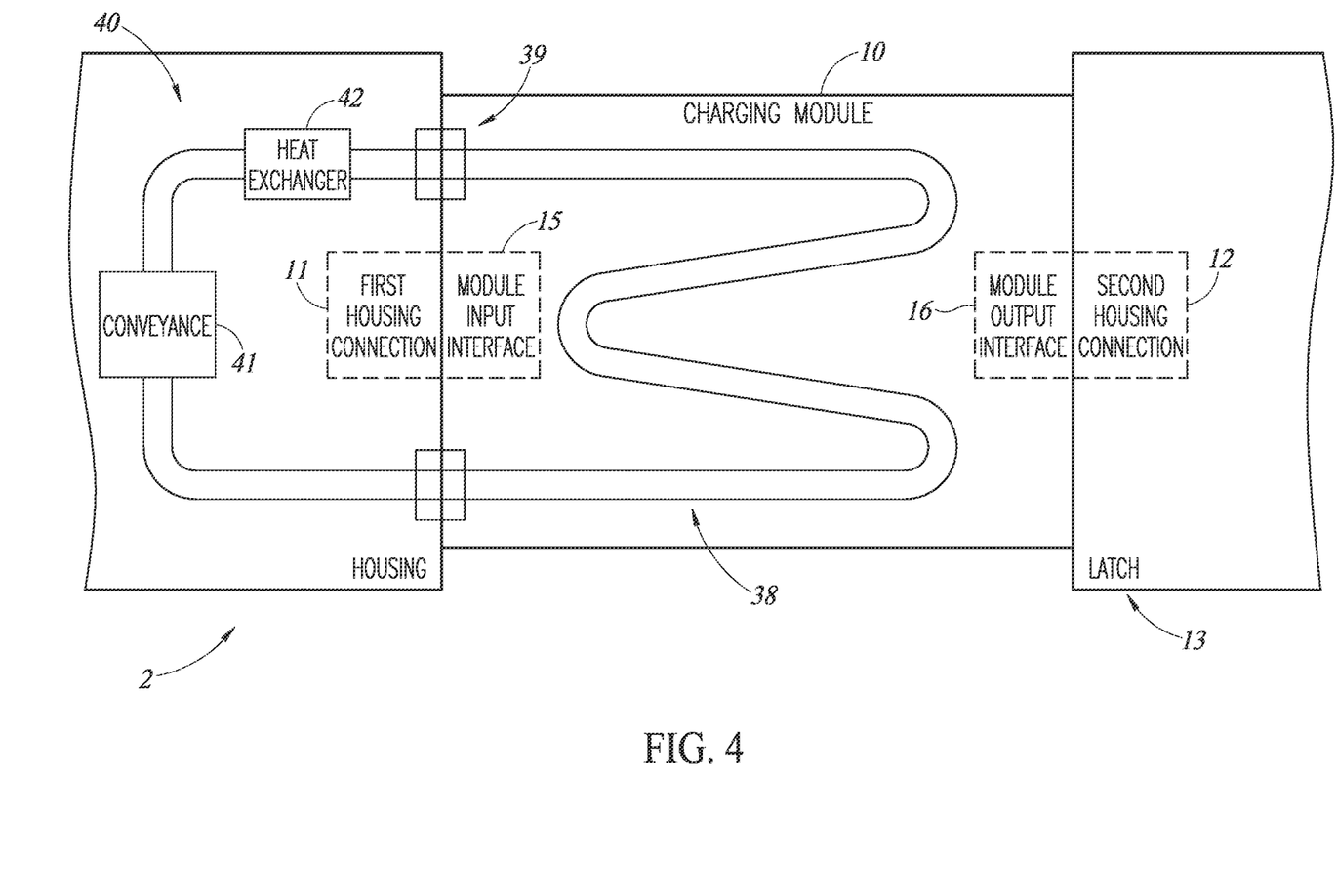
FIG. 4 shows a detailed view of a charging device.

A further improvement in the cooling of the respective charging module 10, as long as it is arranged in the housing 2, can be achieved if a closed coolant circuit is used in addition or as an alternative to the fan 31 shown in FIG. 2. An example of this is shown in FIG. 4, where for reasons of clarity only the components relevant for cooling are shown.

When the charging module 10 is installed in the housing 2, for example by moving the latch 13 to the position shown in FIG. 2, not only are the housing connections 11, 12 respectively connected to the module input interface 15 or alternatively the module output interface 16, but also coolant connections 39, which connect a coolant channel 38 extending through the charging module 10, are connected to a coolant circuit 40 of the housing 2. The coolant circuit 40 is shown only schematically in FIG. 4 and may comprise, for example, a means of conveyance 41, for example a pump, and a heat exchanger 42 for dissipating heat. In particular, if a liquid coolant is used, the coolant connections 39 should be designed to be automatically closed when the coolant connections are disconnected.

German patent application no. 10 2020 115487.9, filed Jun. 10, 2020, to which this application claims priority, is hereby incorporated herein by reference in its entirety.

Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A charging device for a motor vehicle, comprising:
a housing;
a device input interface coupled to the housing for connecting the charging device to a power source;
a device output interface that, in operation, connects the charging device to a charging port of the motor vehicle and provides a charging current that charges an energy storage device of the motor vehicle;
a plurality of charging modules; and,
a plurality of latches respectively corresponding to the plurality of charging modules,
wherein each charging module of the charging modules includes a module input interface, a module output interface, and a voltage rectifier,
wherein the device input interface, in operation, provides an input voltage to the module input interface of each charging module,
wherein the voltage rectifier of each charging module, in operation, converts the input voltage into an output voltage provided at the module output interface of the charging module;
wherein the module output interface of each of the charging modules is connected in parallel with the device output interface,
wherein at least one of the charging modules is removable from the charging device, such that the at least one of the charging modules removed from the charging device, in operation, charges, separately from the charging device, the energy storage device of the motor vehicle or a further energy storage device of a further motor vehicle from the power source or a further power source,
wherein each of the latches is movable between a first position and a second position,
wherein, while each charging module is inserted in the housing and one of the latches corresponding to the charging module is in the first position, the module output interface of the charging module is electrically connected to the device output interface and the charging module is locked to the housing,
wherein, while each charging module is inserted in the housing and the one of the latches corresponding to the charging module is in the second position, the module output interface of the charging module is electrically disconnected from the device output interface and the charging module is removable from the housing, wherein each charging module has a control device coupled between the module input interface of the charging module and the module output interface of the charging module, wherein each charging module in operation:
- detects an operating parameter of the charging module or receives communication information from a communication device on the motor vehicle; and
- controls or regulates the output voltage at the module output interface of the charging module or a charging current based on the operating parameter or the communication information.

2. The charging device according to claim 1, wherein the voltage rectifier of each charging module is connected to the module input interface of the charging module by an input switching device, wherein the input switching device of each charging module, in operation, disconnects at least one terminal of the voltage rectifier of the charging module from the module input interface or connects the at least one terminal of the voltage rectifier of the charging module to the module input interface based on a control signal of the control device of the charging module.

3. The charging device according to claim 1, wherein the respective voltage rectifier is connected to the module output interface by a respective output switching device, wherein the respective output switching device is configured to disconnect the voltage rectifier or at least one terminal of the voltage rectifier from the module output interface or to connect it to the module output interface depending on a control signal from the control device.

4. The charging device according to claim 1, wherein the housing includes a plurality of first housing connections and a plurality of second housing connection, wherein each first housing connection of the first housing connections connects the module input interface of one of the charging modules to the device input interface fitted to the housing, and wherein each second housing connection of the second housing connections connects the module output interface of one of the charging modules to the device output interface fitted to the housing.

5. The charging device according to claim 4, further comprising a fan that, in operation, cools the charging modules.

6. The charging device according to claim 5, wherein each of the charging modules includes a heat sink which is adjacent to an air volume in which the fan is arranged.

7. The charging device according to claim 4, wherein each charging module includes a coolant channel and a plurality of coolant connections, wherein the charging device includes a coolant circuit coupled to the coolant channel of each charging module by the coolant connections of each charging module.

8. The charging device according to claim 7, wherein the coolant connections of the at least one of the charging modules are self-sealing such that, while the at least one of the charging modules is removed from the housing, coolant inside of the at least one of the charging modules remains sealed in the at least one of the charging modules by the coolant connections of the at least one of the charging modules.

9. The charging device according to claim 4, wherein each charging module includes a housing sensor, wherein the control device, in operation, detects, by the housing sensor of each charging module, whether each charging module is held in the housing and adapts the output voltage of at least one of the charging modules or the charging current or a further operating parameter of the charging module.

10. The charging device according to claim 1, wherein the control device is configured to receive the communication information wirelessly or by wire via the module output interface or to transmit further communication information wirelessly or by wire via the module output interface.

11. The charging device according to claim 1 wherein the input voltage is an alternating current voltage.

12. The charging device according to claim 1 wherein the output voltage is a direct current voltage.

13. A charging system, comprising:
- a charging device, including:
  - a housing;
  - a device input interface coupled to the housing for connecting the charging device to a power source;
  - a device output interface that, in operation, connects the charging device to a charging port of a motor vehicle and provides a charging current that charges an energy storage device of the motor vehicle;
  - a plurality of charging modules;
  - a plurality of latches respectively corresponding to the plurality of charging modules,
  - wherein each charging module of the charging modules includes a module input interface, a module output interface, and a voltage rectifier,
  - wherein the device input interface, in operation, provides an input voltage to the module input interface of each charging module,
  - wherein the voltage rectifier of each charging module, in operation, converts the input voltage into an output voltage provided at the module output interface of the charging module,
  - wherein the module output interface of each of the charging modules is connected in parallel with the device output interface,
  - wherein at least one of the charging modules is removable from the charging device, such that the at least one of the charging modules removed from the charging device, in operation, charges, separately from the charging device, the energy storage device of the motor vehicle or a further energy storage device of a further motor vehicle from the power source or a further power source,
  - wherein each of the latches is movable between a first position and a second position,
  - wherein, while each charging module is inserted in the housing and one of the latches corresponding to the charging module is in the first position, the module output interface of the charging module is electrically connected to the device output interface and the charging module is locked to the housing,
  - wherein, while each charging module is inserted in the housing and the one of the latches corresponding to the charging module is in the second position, the module output interface of the charging module is electrically disconnected from the device output interface and the charging module is removable from the housing,
  - wherein each charging module has a control device coupled between the module input interface of the charging module and the module output interface of the charging module, and
  - wherein each charging module in operation:
    - detects an operating parameter of the charging module or receives communication information from a communication device on the motor vehicle; and controls or regulates the output voltage at the module output interface of the charging module or a charging current based on the operating parameter or the communication information;
a first connection cable that, in operation, connects the module input interface of one of the charging modules to the power source or the further power source; and
a second connection cable for connecting that, in operation, connects the module output interface of the one of the charging modules to the charging port of the motor vehicle or a charging port of the further motor vehicle.

* * * * *

UNITED STATES PATENT AND TRADEMARK OFFICE
CERTIFICATE OF CORRECTION

PATENT NO. : 12,017,552 B2
APPLICATION NO. : 17/343625
DATED : June 25, 2024
INVENTOR(S) : Tobias Graäÿl It is certified that error appears in the above-identified patent and that said Letters Patent is hereby corrected as shown below:

In the Claims

Column 11, Claim 13, Line 8:
"a second connection cable for connecting that, in operation,"
Should read:
--a second connection cable that, in operation,--.

Signed and Sealed this
Tenth Day of September, 2024

Katherine Kelly Vidal
*Director of the United States Patent and Trademark Office*